United States Patent
Lee et al.

(10) Patent No.: US 10,690,519 B2
(45) Date of Patent: Jun. 23, 2020

(54) METER READING SENSOR USING TMR AND HALL EFFECT SENSORS

(71) Applicant: Landis+Gyr Innovations, Inc., Alpharetta, GA (US)

(72) Inventors: Tou Lee, Alpharetta, GA (US); Vidya Prakash, Alpharetta, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 84 days.

(21) Appl. No.: 15/903,127

(22) Filed: Feb. 23, 2018

(65) Prior Publication Data

US 2019/0265075 A1   Aug. 29, 2019

(51) Int. Cl.
  *G01R 33/09* (2006.01)
  *G01D 5/244* (2006.01)
  *G01D 5/14* (2006.01)
  *G01D 4/00* (2006.01)

(52) U.S. Cl.
  CPC ......... *G01D 5/24457* (2013.01); *G01D 4/002* (2013.01); *G01D 4/008* (2013.01); *G01D 5/145* (2013.01)

(58) Field of Classification Search
  CPC ...... G01R 33/09; G01R 33/093; G01R 33/07; H04Q 2209/40; H04Q 2209/60; H04Q 2209/47
  USPC ............. 324/207.2, 207.21, 244, 244.1, 248, 324/249–253, 256–258, 251, 117 H; 320/825.54, 870.03, 870.05, 870.07, 320/870.11, 870.02
  See application file for complete search history.

(56) References Cited

U.S. PATENT DOCUMENTS

| | | | |
|---|---|---|---|
| 5,659,300 A * | 8/1997 | Dresselhuys | G01D 4/006 340/870.02 |
| 6,615,147 B1 | 9/2003 | Jonker et al. | |
| 6,816,360 B2 | 11/2004 | Brooksby et al. | |
| 7,135,850 B2 | 11/2006 | Ramirez | |
| 7,469,190 B2 | 12/2008 | Bickel | |
| 7,693,670 B2 | 4/2010 | Durling et al. | |

(Continued)

FOREIGN PATENT DOCUMENTS

| | | |
|---|---|---|
| CN | 2399707 | 10/2002 |
| CN | 101871801 | 10/2010 |

(Continued)

OTHER PUBLICATIONS

International Patent Application No. PCT/US2019/019089, "International Search Report and Written Opinion", dated Apr. 12, 2019, 13 pages.

*Primary Examiner* — Patrick Assouad
*Assistant Examiner* — Taqi R Nasir
(74) *Attorney, Agent, or Firm* — Kilpatrick Townsend & Stockton LLP

(57) ABSTRACT

A system may include a dial wheel having a first magnet located at a first orbital position of the dial wheel and a second magnet located at a second orbital position of the dial wheel. A polarity of the first magnet at a surface of the dial wheel is opposite a polarity of the second magnet at the surface of the dial wheel. A sensor board includes a first magnetic sensor for sensing a magnetic field and is configured so that the first and second magnets cause the first magnetic sensor to generate an output pulse for each rotation of the dial wheel. The pulsed output is indicative of a volume of resource consumed.

19 Claims, 15 Drawing Sheets

(56) References Cited

U.S. PATENT DOCUMENTS

| | | |
|---|---|---|
| 7,990,806 B2 | 8/2011 | Chen |
| 8,004,933 B2 | 8/2011 | Iseli |
| 8,121,741 B2 | 2/2012 | Taft et al. |
| 8,223,466 B2 | 7/2012 | Roscoe |
| 8,322,215 B2 | 12/2012 | Lakich et al. |
| 8,326,554 B2 | 12/2012 | Caird |
| 8,635,036 B2 | 1/2014 | Pamulaparthy et al. |
| 8,754,634 B2 | 6/2014 | Chamarti et al. |
| 8,830,083 B2 | 9/2014 | LaFrance et al. |
| 8,854,217 B2 | 10/2014 | Brown et al. |
| 8,947,246 B2 | 2/2015 | Aiken |
| 8,978,443 B2 | 3/2015 | Ramirez |
| 8,996,144 B2 | 3/2015 | LaFrance et al. |
| 9,164,135 B2 | 10/2015 | Cs et al. |
| 9,304,014 B2 | 4/2016 | Komati et al. |
| 9,341,686 B2 | 5/2016 | Deak et al. |
| 9,476,740 B2 | 10/2016 | Zigovszki et al. |
| 9,557,392 B2 | 1/2017 | Schuhl et al. |
| 9,602,895 B2 | 3/2017 | Bowling et al. |
| 9,671,254 B2 | 6/2017 | Zigovszki et al. |
| 9,887,051 B2 | 2/2018 | LaFrance et al. |
| 9,891,088 B2 | 2/2018 | Zigovszki et al. |
| 10,240,961 B2 | 3/2019 | Cheng et al. |
| 10,254,315 B2 | 4/2019 | Higashi et al. |
| 10,295,578 B2 | 5/2019 | Higashi et al. |
| 2014/0208865 A1* | 7/2014 | Isicovich ............... G01F 1/075 73/861.11 |
| 2014/0247044 A1* | 9/2014 | Mitsuya ................. G01R 33/09 324/252 |
| 2015/0077101 A1* | 3/2015 | Oikawa .............. G01R 33/0041 324/258 |
| 2015/0160272 A1* | 6/2015 | Juds ..................... H01H 33/027 324/244 |
| 2015/0253157 A1* | 9/2015 | Granig ................. G01D 5/145 324/252 |
| 2016/0069723 A1* | 3/2016 | Cheng .................... G01D 5/14 324/207.21 |
| 2017/0153123 A1* | 6/2017 | Cullinan ............... G01D 4/002 |
| 2018/0073910 A1 | 3/2018 | Deak et al. |
| 2018/0106640 A1 | 4/2018 | Padrones et al. |
| 2019/0041439 A1 | 2/2019 | Brown |
| 2019/0094329 A1 | 3/2019 | Minich |
| 2019/0101411 A1 | 4/2019 | Davis et al. |
| 2019/0219618 A1 | 7/2019 | Davis et al. |

FOREIGN PATENT DOCUMENTS

| | | |
|---|---|---|
| WO | 2018072030 A1 | 4/2018 |
| WO | 2018083902 A1 | 5/2018 |
| WO | 2019026791 A1 | 2/2019 |

\* cited by examiner

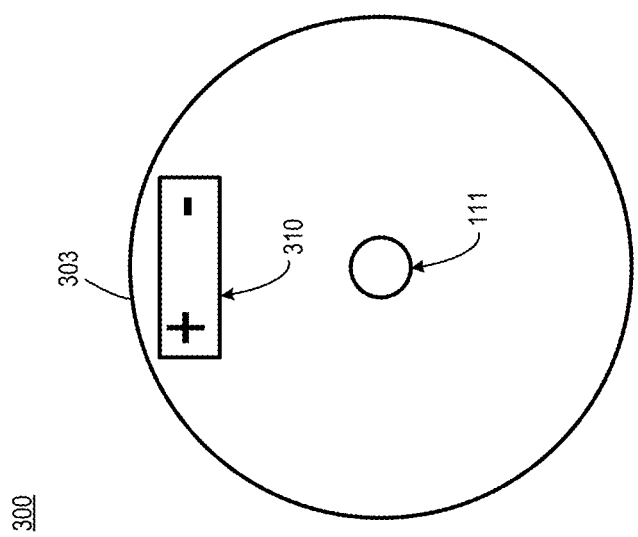
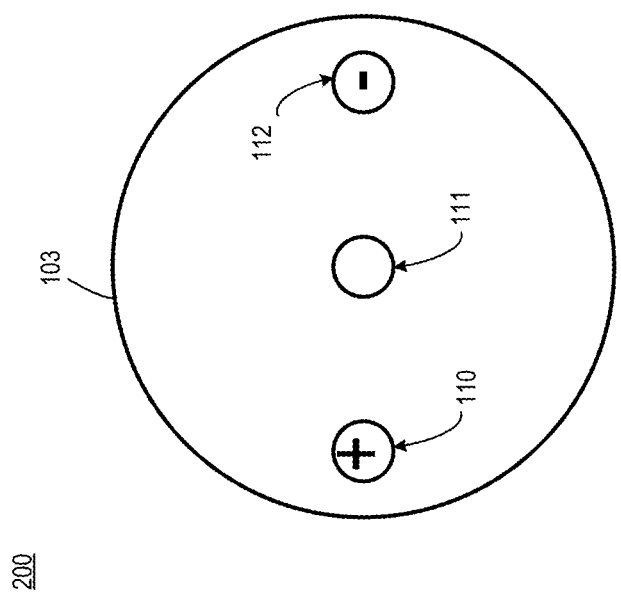
FIG. 3
FIG. 2

METER READING SENSOR USING TMR AND HALL EFFECT SENSORS

TECHNICAL FIELD

This invention relates generally to metering devices for resource distribution systems and more specifically to a meter reading sensor using Hall effect sensors.

BACKGROUND

Metering devices are used to measure consumption of resources. Examples of metering devices include electricity meters, water meters, and gas meters. A metering device may communicate consumption of a given resource through a pulse source communicating with a pulse-counting device.

One common pulse source is a magnet positioned on a wheel and one common pulse-counting device is a reed switch. In an example meter device, a crankshaft causes the wheel to spin as the resource flows through the metering device. As the wheel spins, a magnet on the wheel passes by a reed switch, which generates a pulse. An electrical circuit connected to the reed switch counts the pulses and determines the amount of resource consumed. For example, in a meter device with one magnet, a rotation of the wheel causes one pulse. The number of pulses therefore equals the number of units of a particular volume of the resource that have been consumed.

But the use of reed switches in sensing designs can be problematic, because reed switches only indicate whether a magnetic field is present, and cannot detect small changes in magnetic field. As a consequence, a metering device using reed switches is susceptible to magnet bounce. Magnet bounce occurs when magnet bounces between clockwise and counterclockwise directions before coming to a stop. A reed switch cannot distinguish a magnet bouncing past that causes a small change in magnetic field from a magnet that has made a complete rotation.

Additionally, sensing designs that use reed switches are sensitive to external magnetic fields (for example, from tampering). Because a reed switch cannot measure small magnetic variations, a placement of an external magnetic field caused by a magnet designed to interfere with the measurement of the resource goes undetected. External magnetic fields can cause false activation of the reed switch when the dial wheel has not moved.

Reed switches are also sensitive to magnet misalignment, which can occur when the magnet, the sensor, or the wheel are misaligned. Because reed switches only allow for a very small amount of variation, reed switches can cause erroneous results to be measured if misalignment occurs.

Accordingly, improved meter sensor designs are needed.

SUMMARY

Certain aspects and features include a system and method for meter reading sensor design using tunnel magnetoresistance (TMR) sensors or Hall effect sensors. In one example, the system includes a dial wheel having two magnets oriented at opposite polarities and configured to generate a magnetic field as the dial wheel rotates, the magnetic field detected by a sensor.

In one aspect, a dial wheel including a first magnet located at a first orbital position of the dial wheel and a second magnet located at a second orbital position of the dial wheel. A polarity of the first magnet at a surface of the dial wheel is opposite a polarity of the second magnet at the surface of the dial wheel. A sensor board includes a first magnetic sensor for sensing a magnetic field, positioned so that during a rotation of the dial wheel relative to the sensor board, when the dial wheel is in a first position the first magnet is aligned with the first magnetic sensor and when the dial wheel is in a second position the second magnet is aligned with first magnetic sensor.

The first magnetic sensor is configured to generate a digital output pulse for each rotation of the dial wheel. When the dial wheel is in a first position, the pulsed output is a first value. As the dial wheel rotates from the first position to the second position, the pulsed output remains at the first value until the magnetic field sensed by the first magnetic sensor reaches a second threshold value. Once the magnetic field reaches the second threshold value, the pulsed output switches to a second value and remains at the second value until the dial wheel rotates to the second position. As the dial wheel rotates from the second position to the first position, the pulsed output remains at the second value until the magnetic field sensed by the first magnetic sensor reaches a first threshold value. Once the magnetic field reaches the first threshold value, the pulsed output switches to the first value. The pulsed output is indicative of a volume of resource consumed.

These illustrative examples are mentioned not to limit or define the disclosure, but to provide examples to aid understanding thereof. Additional examples and further description are provided in the Detailed Description.

BRIEF DESCRIPTION OF THE FIGURES

These and other features, aspects, and advantages of the present disclosure are better understood when the following Detailed Description is read with reference to the accompanying drawings, where:

FIG. 2 illustrates a exemplary dial wheel with magnets mounted thereon.

FIG. 3 illustrates a second exemplary dial wheel with magnets mounted thereon.

DETAILED DESCRIPTION

Figure 1:
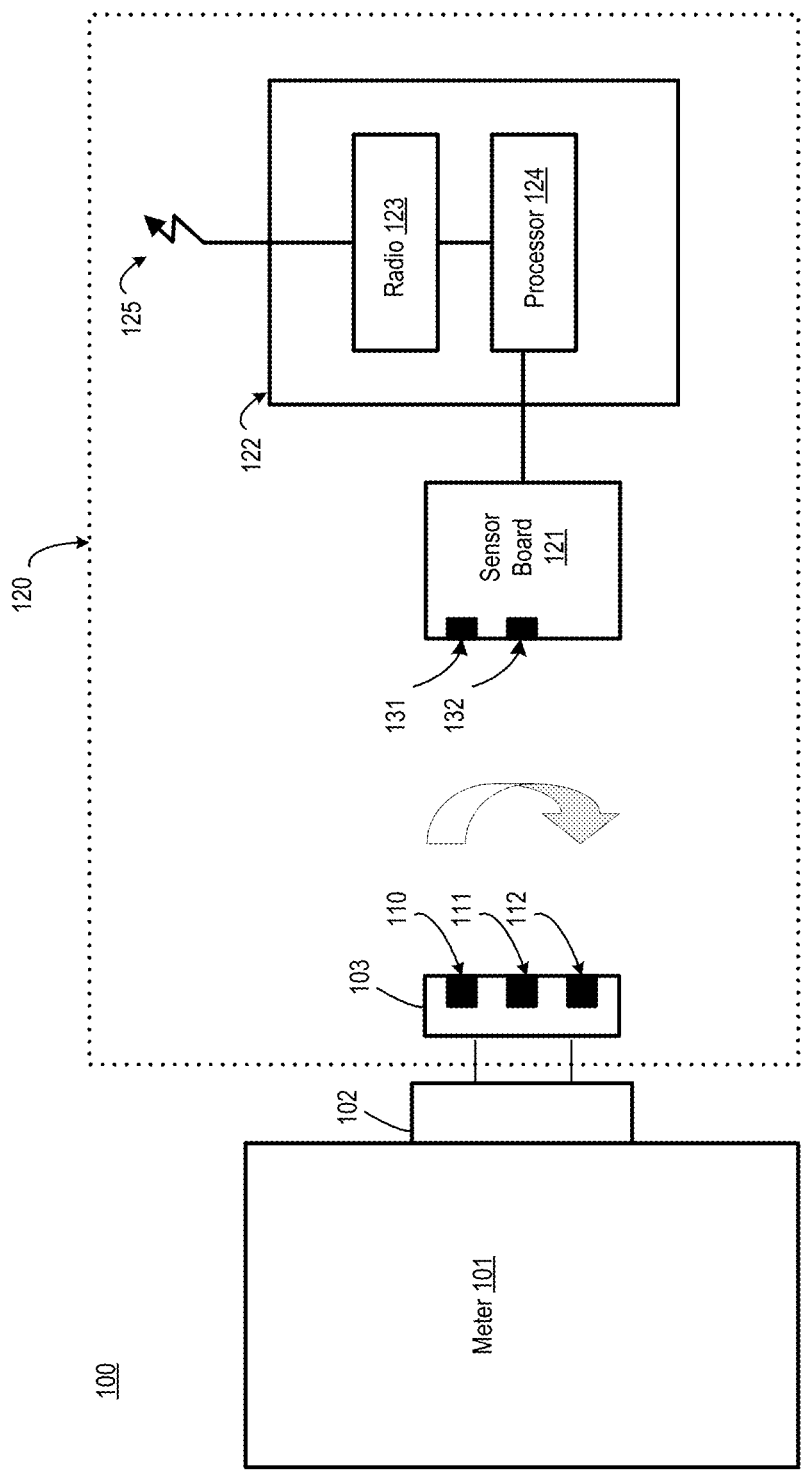
FIG. 1 illustrates an exemplary meter reading sensor system.

Aspects of the present invention relate to meter reading design using Hall effect sensors. Hall effect sensors are transducers that vary an output signal in response to a magnetic field. Hall effect sensors provide a continuous response that is proportional to the applied magnetic field and indicates the direction of the magnetic field. In contrast, reed switches provide a binary output based on the presence or absence of a magnetic field. A reed switch completes a circuit when a magnetic field is present and opens the circuit when the magnetic field is absent. The use of Hall effect sensors helps to eliminate reliability issues caused by the use of reed switches, which can be prone to sticking in an open or a closed state.

Because the Hall effect sensor provides a variable output, small changes in magnetic field can be detected. Such small changes are useful for several purposes including tolerating magnet bounce, detecting external magnetic fields, and detecting tampering. As such, a sensor design using Hall effect sensors offers several advantages over a sensor design that uses reed switches.

For example, a meter reading sensor includes a rotating dial wheel with two orbital magnets and a Hall effect sensor. As the resource is consumed, a crankshaft causes an index to spin, which causes the dial wheel to spin as the resource flows through the metering device. A first orbital magnet and a second orbital magnet are located in orbital positions of a dial wheel in opposite magnetic polarity from each other. A sensor board is positioned adjacent to the dial wheel such that the sensor located on the sensor board can detect the rotation of the first and second orbital magnets as the dial wheel rotates. As one magnet approaches the sensor, the magnetic field in one direction increases to a maximum, which occurs when the magnet is directly aligned with the sensor. The magnetic field at the sensor then decreases, and switches polarity as the other magnet, configured in the opposite polarity from the first, approaches the sensor. A tunnel magnetoresistance (TMR) sensor can be used in place of a Hall effect sensor.

The measured signal is translated into a pulsed output that changes state when a threshold is exceeded. A counter is incremented for each pulse. The pulsed output can be implemented either by using a built-in feature of the Hall effect sensor, such as a latch mode, or in conjunction with external circuitry that implements the latch function. Using a pulsed output enables the system to build in a tolerance for magnet bounce without erroneously incrementing the volume counter.

In contrast, a traditional reed switch system cannot distinguish magnet bounce from a normal rotation of the wheel. For example, a reed switch may measure a bounce caused by a clockwise rotation then another bounce caused by a counterclockwise rotation as legitimate rotations of the wheel. Hence, two units of volume would be measured instead of one, causing an erroneous measurement.

The use of Hall effect sensors with latch mode or external latch circuitry also permits a sensor design that can provide additional magnet misalignment tolerance, external magnetic field tolerance, and tamper detection. A third magnet, or center magnet, is located in the center of the dial wheel, providing a near-continuous magnetic field. A second sensor, or center sensor, is configured to measure the magnetic field from the third magnet and thereby supplement the information provided by the first sensor.

Because the magnetic field measured by the second sensor expects a near-constant magnetic field, the sensing system can detect that tampering may be occurring if a change in the magnetic field is detected. Tampering can include removal of the dial wheel, removal of an external enclosure, the presence of an external magnetic source designed to cause erroneous measurements. Further, the sensor can thereby accommodate and ignore small fluctuations in magnetic field that occur from the magnet and the wheel being misaligned. Misalignment can occur due to manufacturing tolerances for example.

In another example, a meter reading sensor system has multiple orbital sensors. The multiple sensors can be in different configurations. For example, two orbital sensors can be located on the sensor board adjacent to the dial wheel. Alternatively, two orbital sensors can be located on the side of the orbital wheel. In a system with multiple orbital sensors, multiple pulses are generated. Systems with multiple sensors can be useful because the additional information provided by the additional sensor provides an additional baseline for normal operation that can be used to detect tampering.

FIG. 1 illustrates an exemplary meter reading sensor system. FIG. 1 shows a meter sensor reading system 100 including a meter 101 and a communications system 120. Communications system 120 can be added to an existing meter 101 in order to provide functionality described herein. Meter 101 can measure consumption of a resource such as gas or water. Meter 101 includes an index 102. As the resource is consumed, index 102 spins.

Communications system 120 includes dial wheel 103, sensor board 121, main board 122, and antenna 125. Communications system 120 can be added to meters that have a mechanical index. In one aspect, communications system 120 physically docks onto a meter and insulates components such as the sensor board 121, main board 122, and antenna 125 from the elements and from external tampering.

As the resource is consumed, the turning index 102 causes dial wheel 103 to spin. A revolution of the wheel indicates that a specific volume of the resource, e.g., 1 cubic foot, has been consumed. Meter 101 can be a legacy meter that was not designed for electronic measurement of resource consumption. In that case, communications system 120 can be added to the meter in order to provide more sophisticated metering capabilities.

Dial wheel 103 includes magnets mounted thereon. FIG. 1 shows orbital magnet 110, orbital magnet 112, and one center magnet 111. Orbital magnets 110 and 112, located in orbital positions on dial wheel 103, are used by meter sensor reading system 100 measure resource consumption. Orbital magnets 110 and 112 can be placed at opposite sides of the dial wheel 103, i.e., 180 degrees apart. But other configurations are possible. Orbital magnets 110 and 112 can be at other orbital positions on dial wheel 103.

Orbital magnets 110 and 112 are installed on dial wheel 103 in opposite polarity, one with its south pole facing towards the sensor board and the other with its north pole facing towards the sensor board. Different numbers of orbital magnets are possible. For example, FIG. 3 shows a dial wheel with one orbital magnet.

Center magnet 111, installed at the center of dial wheel 103, is used for tamper detection, external magnetic field detection, and magnet misalignment detection. Center magnet 111 provides near constant magnetic field as the magnet rotates with the dial wheel 103. An exemplary dial wheel is shown in more detail in FIG. 2.

Sensor board 121 includes orbital sensor 131 and center sensor 132. Orbital sensor 131 measures resource consumption by measuring a changing magnetic field generated by orbital magnets 110 and 112. Orbital sensor 131 can provide an electrical signal indicative of the strength of the detected magnetic field or convert the rotation of dial wheel 103 into an electrical pulse that can be detected and recorded by the processor 124. Orbital sensor 131 can also provide a latched, or pulsed output. Orbital sensor 131 can be implemented with a bipolar Hall effect sensor, bipolar magneto-resistive sensor, tunnel magnetoresistance (TMR) sensor, or any linear analog bipolar magnetic sensor in conjunction with a circuit that can generate a latched output.

Center sensor 132 provides an electrical signal indicative of the strength of the detected magnetic field from center magnet 111. Center sensor can be implemented using a Hall effect sensor or another magnetic sensor such as a magneto-resistive sensor or a reed switch. The signal from center sensor 132 enables the main board 122 to detect tampering, external magnetic fields, and magnet misalignment by measuring the magnetic field generated by center magnet 111.

Main board 122 includes a radio 123, a processor 124, and an antenna 125. Main board 122 can perform a variety of functions, including resource detection, external magnetic field detection, tamper detection, and magnet misalignment detection. The main board 122 receives electrical signals from orbital sensor 131 and center sensor 132. Circuits operating on the main board 122 interpret the received electrical signals. For example, processor 124 receives the electrical signals from orbital sensor 131 and center sensor 132, determines resource consumption, and transmits a message to radio 123. Radio 123 sends or receives messages to a remote system, including the resource consumption, via antenna 125.

FIG. 2 illustrates an exemplary dial wheel with magnets mounted thereon. Dial wheel system 200 includes dial wheel 103. Dial wheel 103 includes orbital magnet 110, orbital magnet 112, and center magnet 111. As the resource is consumed, dial wheel 103 causes orbital magnets 110 and 112 to turn, causing the meter 101 to register increased resource consumption. Orbital magnets 110 and 112 are oriented to be opposite polarity from the perspective of the sensor board 121. FIG. 2 depicts orbital magnet 110 as having a positive end facing towards the sensor board, and orbital magnet 112 as having negative end facing towards the sensor board.

As the dial wheel 103 rotates on its axis, under normal operating conditions, center magnet 111 emits a near-constant magnetic field. Center sensor 132 detects the magnetic field from center magnet 111 and any other magnetic fields. Center sensor 132 is used to detect tampering, external magnetic fields, or magnet misalignment.

As discussed with respect to FIG. 1, a dial wheel may include any number of magnets. For example, a dial wheel may include four orbital magnets positioned such that the magnets have alternating polarities facing towards the sensor board. In such a configuration, the orbital sensor detects a positive magnetic field followed by a negative magnetic field, followed by another positive magnetic field then a negative magnetic field. The sequence indicates one rotation of the dial wheel 103.

FIG. 3 illustrates a second exemplary dial wheel with magnets mounted thereon. Dial wheel system 300 includes dial wheel 303. Dial wheel 303 includes two magnets, an orbital magnet 310 and center magnet 111. Center magnet is located above the center of the dial wheel 303, oriented such that one polarity of the magnet facing towards the sensor board and the other end facing away from the sensor board.

Orbital magnet 310 is oriented along the circumference of dial wheel 303. Orbital magnet 310 performs the function performed by orbital magnets 110 and 112. In an aspect, orbital magnet 310 is a bar magnet, where the ends are of different polarity. As dial wheel 301 turns, orbital magnet 310 passes by orbital sensor 131, causing an increase in magnetic field measured at orbital sensor 131 caused by one end of orbital magnet 310, followed by a decrease as the middle of orbital magnet 310 passes by orbital sensor 131, followed by an increase of the magnetic field in of the opposite polarity caused by the other end of orbital magnet 310. Accordingly, the magnitude of the magnetic field repeatedly increases and decreases as dial wheel 301 rotates.

Figure 5:
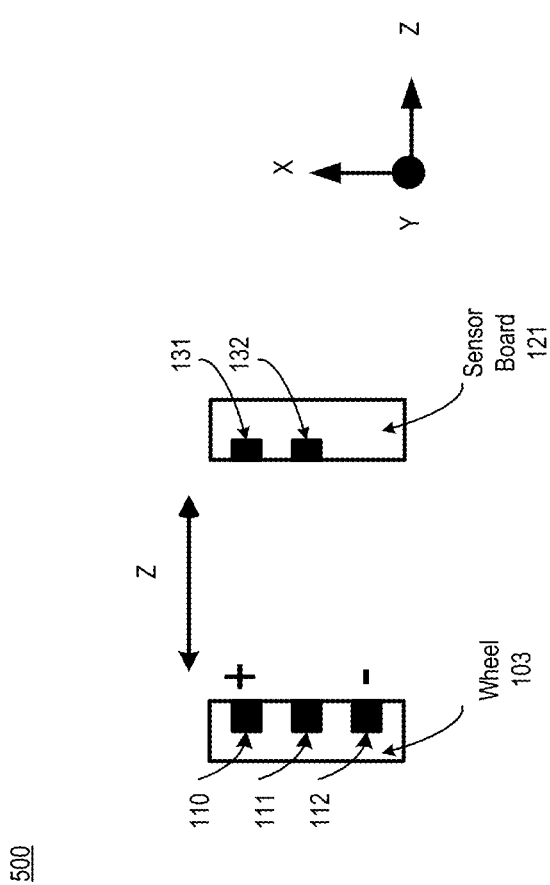
FIG. 5 illustrates a side view of an exemplary dial wheel and sensor board.
Figure 16:
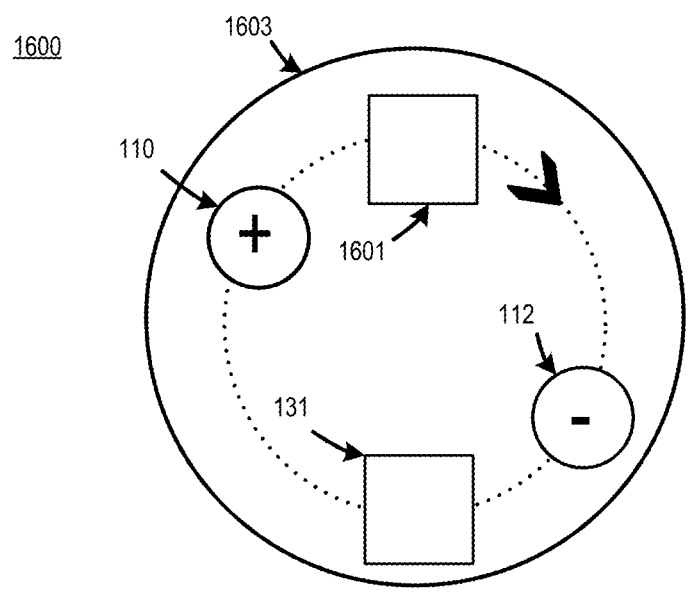
FIG. 16 illustrates an exemplary dial wheel with two orbital sensors.

Dial wheel systems 200 and 300 can be used with different sensor configurations. For example, dial wheel systems 200 and 300 can be used with a sensor board that includes one orbital sensor, as depicted in FIGS. 1 and 5. Dial wheels systems 200 and 300 can also be used with a sensor configuration that includes two orbital sensors, for example, as depicted in FIG. 16.

Figure 4:
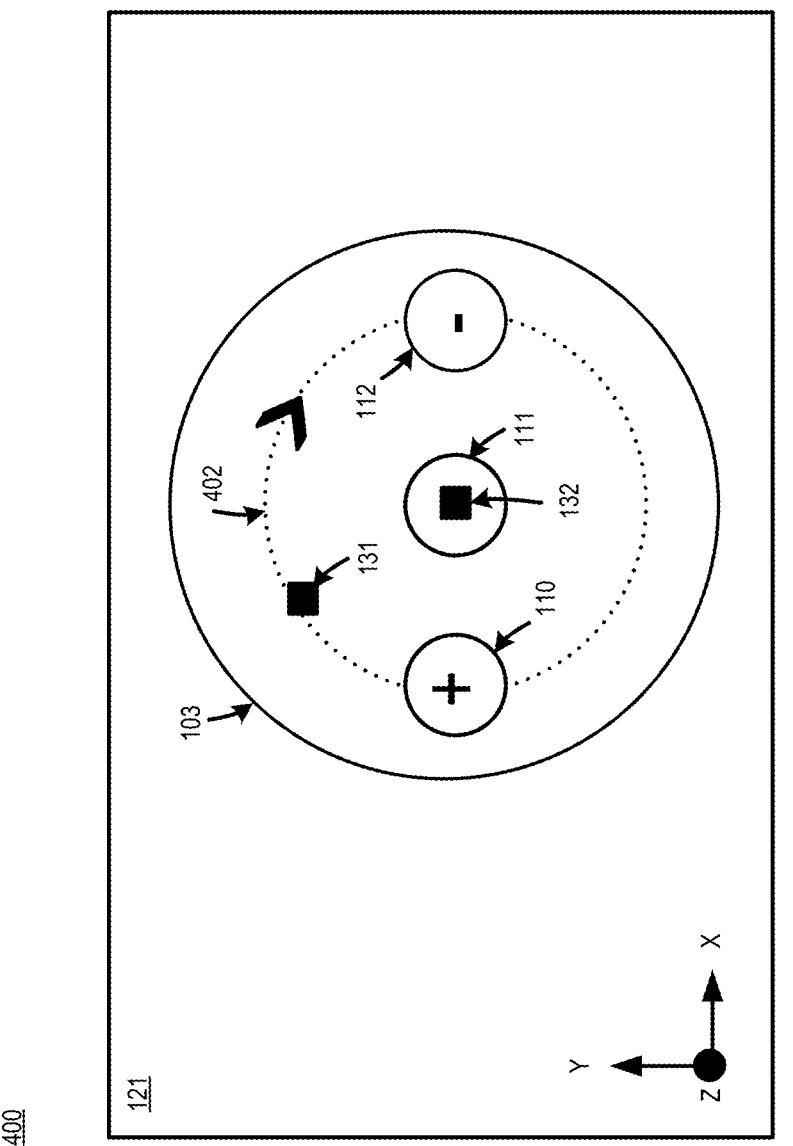
FIG. 4 illustrates an exemplary dial wheel and sensor board.

FIG. 4 illustrates an exemplary dial wheel and sensor board. Meter reading sensor system 400 includes sensor board 121 and dial wheel 103. Sensor board 121 includes orbital sensor 131 and center sensor 132. FIG. 4 shows orbital magnets 110 and 112 superimposed over sensor board 121 for illustrative purposes. Orbital magnets 110 and 112 are configured to have opposite polarities. For example, orbital magnet 110 is shown as having positive polarity facing outward from the sensor board 121 and orbital magnet 112 is shown as having negative polarity facing outward.

Orbital sensor 131 can be a Hall effect sensor, such as a bipolar Hall effect sensor. A Hall effect sensor detects the magnetic field component vertical, i.e., normal to, its surface area and converts the detected magnetic field into a hall voltage that is directly proportional to the magnetic field. Hall effect sensors also detect magnet polarity. For example, a north pole of a magnet causes a Hall effect sensor to generate a voltage that has the opposite polarity from a voltage generated in response to sensing a south pole of a magnet.

Orbital sensor 131 can be a Hall effect sensor configured to use latch mode. Latch mode provides one of two output states, high or low, based on a detected polarity of a magnetic field. In latch mode, the Hall effect sensor emits a high state in response to a predefined magnetic polarity and magnitude (e.g., a high threshold value) and switches to a low state when the magnetic field reaches an opposite polarity and a predefined magnitude (e.g., a low threshold value). In one aspect, the high state reflects a positive magnetic field and a low state reflects a negative magnetic field. But the high state can be configured to reflect a negative magnetic field and vice versa.

The latch function thereby implements a threshold function, which is useful for resilience against magnet bounce and external magnetic field resilience because magnetic field changes that are less than a threshold do not cause the latch output to change states. Using latch mode, orbital sensor 131 generates a pulse as the dial wheel 103 rotates, where a pulse represents a revolution of the dial wheel and a corresponding volume of resource consumed.

A minimum magnitude magnetic field causes the latch to switch between states. This minimum can typically be configured. In one aspect, the threshold function can be based on magnet hysteresis, i.e., with both a positive and a negative threshold. For example, a positive threshold can be the positive hysteresis level of +5 mT. The negative threshold can be the negative hysteresis level of −5 mT.

Path 402 shows an example path taken by orbital magnets 110 and 112 as dial wheel 103 spins, causing magnets to rotate past orbital sensor 131. Path 402 shows a clockwise direction of rotation, i.e., rotating clockwise increases the count of resource used, but either direction is possible. Orbital sensor 131 detects the changing magnetic field, which rises and falls as the orbital magnets 110 and 112 pass by the orbital sensor 131. As the magnetic field detected by orbital sensor 131 rises past the high threshold, the latch output changes state to high. As the dial wheel continues, the detected magnetic field decreases until it is lower than the low threshold, at which point the latch output changes state to low.

Center sensor 132 detects external magnetic fields, tampering, and magnet misalignment. Center sensor 132 can be a Hall effect sensor, a magento-resistive sensor, or other sensor. Tampering can include a presence of a high magnetic field or a low magnetic field. For example, a high magnetic field can be caused by the an external magnet. A low magnetic field can be caused if part of the meter system is removed, such as the sensor board, wheel, or magnets.

More specifically, center magnet 111 provides a near constant magnetic field, detected by center sensor 132, as the dial wheel 103 is fixed in distance from the sensor board 121 and the center sensor and center magnet remain aligned as the dial wheel rotates. Center magnet 111 can be oriented either with either polarity facing the center sensor 132. Center sensor 132 passes the generated electric signal back to the main board 122, where the processor 124 detects any abnormal changes caused by an external magnet or tampering.

The output from center sensor 132 can be compared to a threshold or range of acceptable values. For example, a removal of the external cover or tampering of the dial wheel can cause the measured magnetic field at center sensor 132 to change sufficiently to cross a threshold. If the detected magnetic field at center sensor 132 is beyond the threshold or range, the processor 124 can send an alert message to radio 123. The radio may transmit an alarm message to an external system. The processor 124 can send a message via communication port such as a serial port to notify an external entity such as a utility company. The processor 124 can also log the tamper event and send the alarm to the external entity at a scheduled time.

Figure 19:
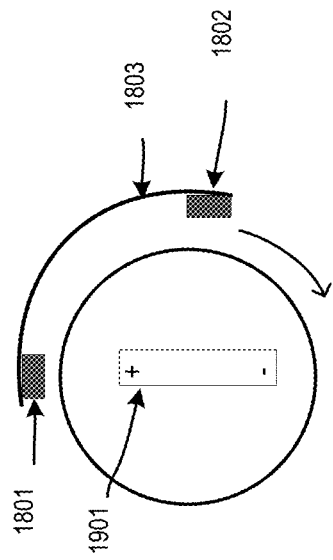
FIGS. 18-19 illustrate configurations in which the sensors are located on the circumference of the dial-wheel.
Figure 18:
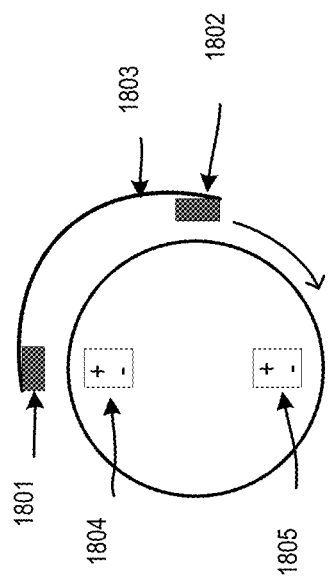

Tamper detection can be implemented in different ways. For example, as depicted in FIGS. 18 and 19, tamper detection can be implemented by one or more sensors located around the circumference of the dial wheel. Using expected norms, the system can detect tampering based on the measured magnetic field varying past the expected norms by a threshold amount.

FIG. 5 illustrates a side view of an exemplary dial wheel and sensor board. FIG. 5 shows wheel and sensor system 500. Wheel and sensor system 500 includes dial wheel 103, sensor board 121, and a three-axis coordinate system in the x, y, and z directions. Dial wheel 103 is positioned such that sensor board 121 is sufficiently close in dimension Z for the magnets 110-112 to be detected by sensors 131-132. Sensor board 121 is in a fixed position and dial wheel 103 rotates as the resource is consumed.

Figure 6:
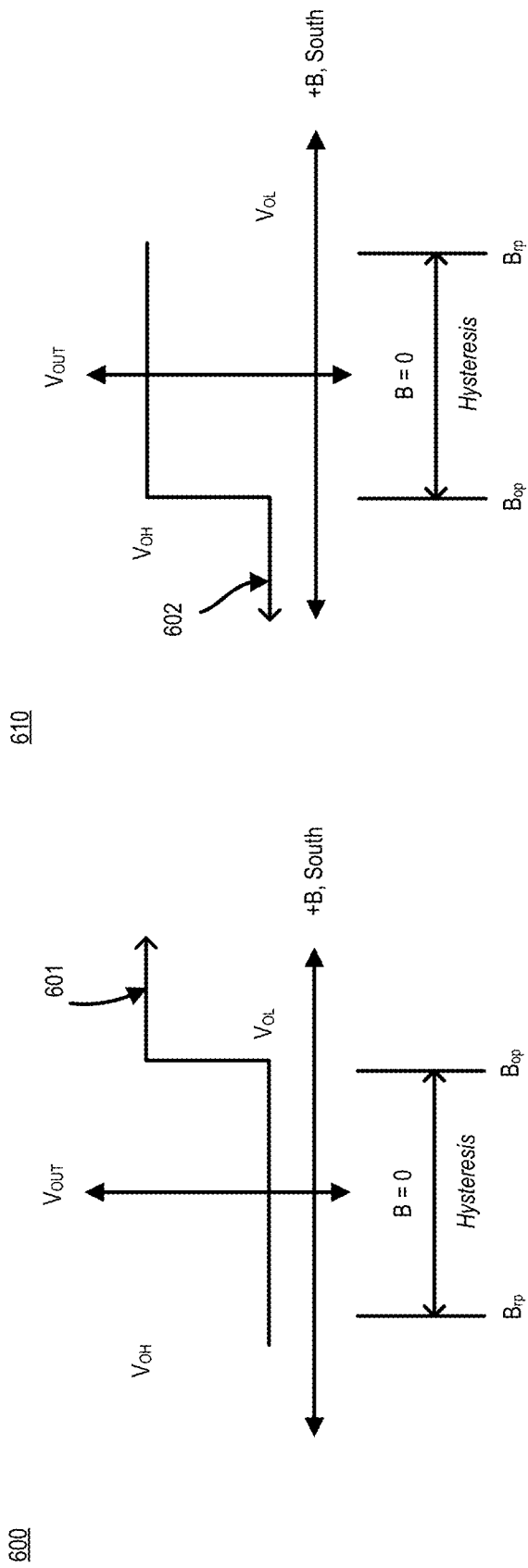
FIG. 6 illustrates example operating characteristics of a latch Hall effect or TMR sensor.

FIG. 6 illustrates example operating characteristics of a latch Hall effect or tunnel magnetoresistance (TMR) sensor. FIG. 6 depicts graph 600 with waveform 601, and graph 610 with waveform 602. Waveform 601 on graph 600 represents the change in output voltage of a sensor as the magnetic field moves from negative to positive. In contrast, waveform 602 on graph 610 represents the change in output voltage of a sensor when the magnetic field moves from positive to negative.

Graphs 600 and 610 both show an operating point $B_{op}$ and a release point $B_{rp}$. The operating point represents the magnitude of magnetic field necessary to trigger the latch and cause the output to change states from high to low or vice versa. The difference between operating point $B_{op}$ and release point $B_{rp}$ is the hysteresis, or $B_{hys}$. As can be seen, the operating point and release point vary based between waveform 601 and waveform 602.

In an example, the threshold for a latch sensor is typically at zero mT (milli-tesla). The operating point $B_{op}$ and release point $B_{rp}$ together configure the hysteresis ($B_{hys}$) around a zero threshold. More specifically, waveform 601 in graph 600 shows that as a magnetic field that is lower than $B_{rp}$ increases past $B_{op}$, the output latches to high, or $V_{OH}$. In contrast, waveform 602 on graph 610 represents the change in output voltage of a sensor when the magnetic field moves from positive to negative. As a magnetic field that is higher than $B_{op}$ decreases past $B_{rp}$, the output voltage latches to low, or $V_{OL}$.

The latch output can be configured in the opposite direction, i.e., the output voltage can be set to be $V_{OH}$ when the detected magnetic field is lower than $B_{rp}$ and to $V_{OL}$ when the detected magnetic field is higher than $B_{op}$.

Figure 7:
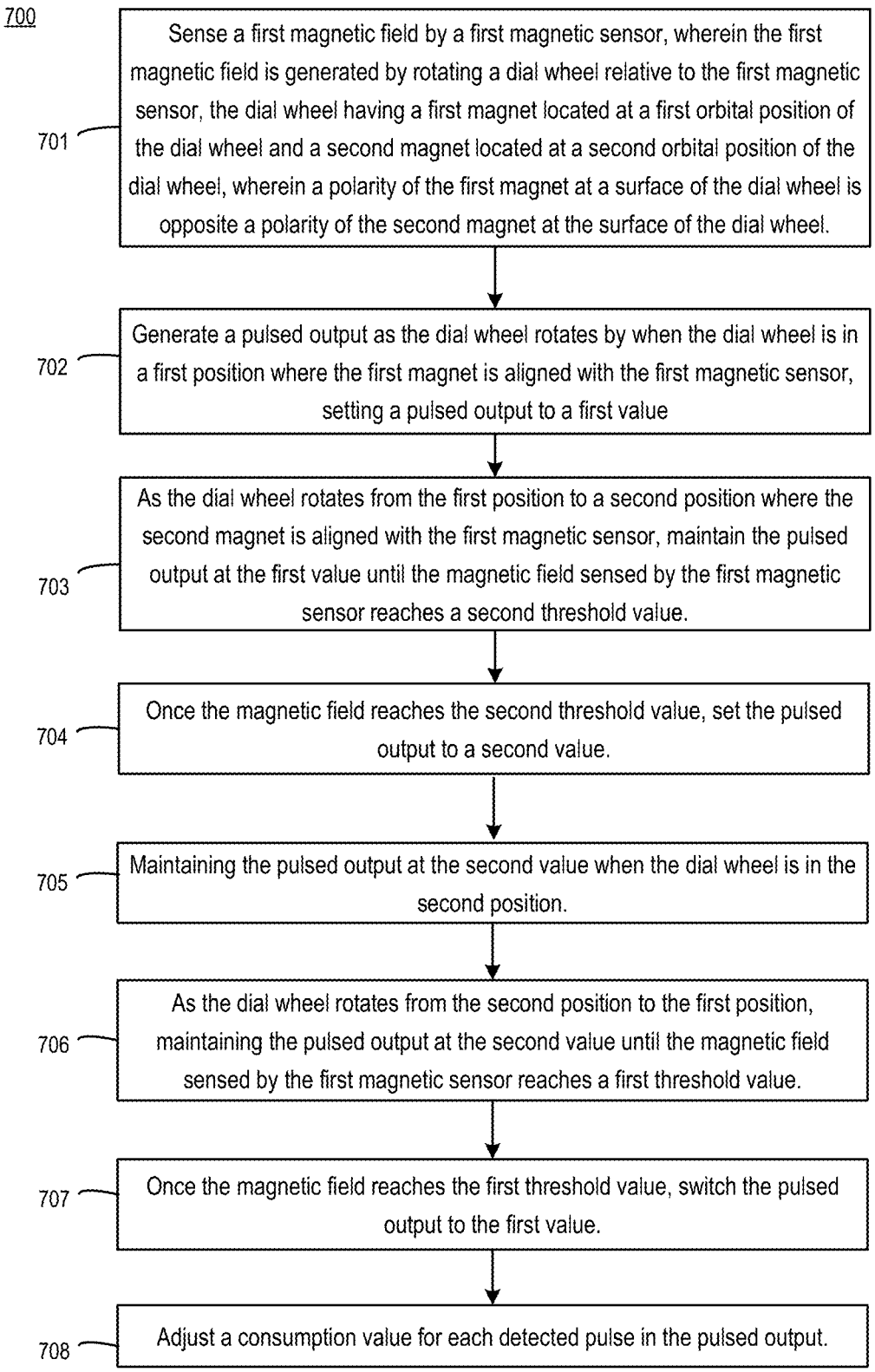
FIG. 7 illustrates an exemplary method of detecting resource consumption using Hall effect sensors.

FIG. 7 illustrates an exemplary method of detecting resource consumption using Hall effect sensors. Method 700 is best explained in conjunction with FIGS. 8-12. Method 700 generates a pulsed output as the wheel rotates. FIGS. 8-12 include one orbital sensor 131, which generates a single pulse per unit of resource measured. The sensor implementation depicted in FIGS. 8-12 represents a "Form-A" or "single-pole single-throw" switch.

Figure 8:
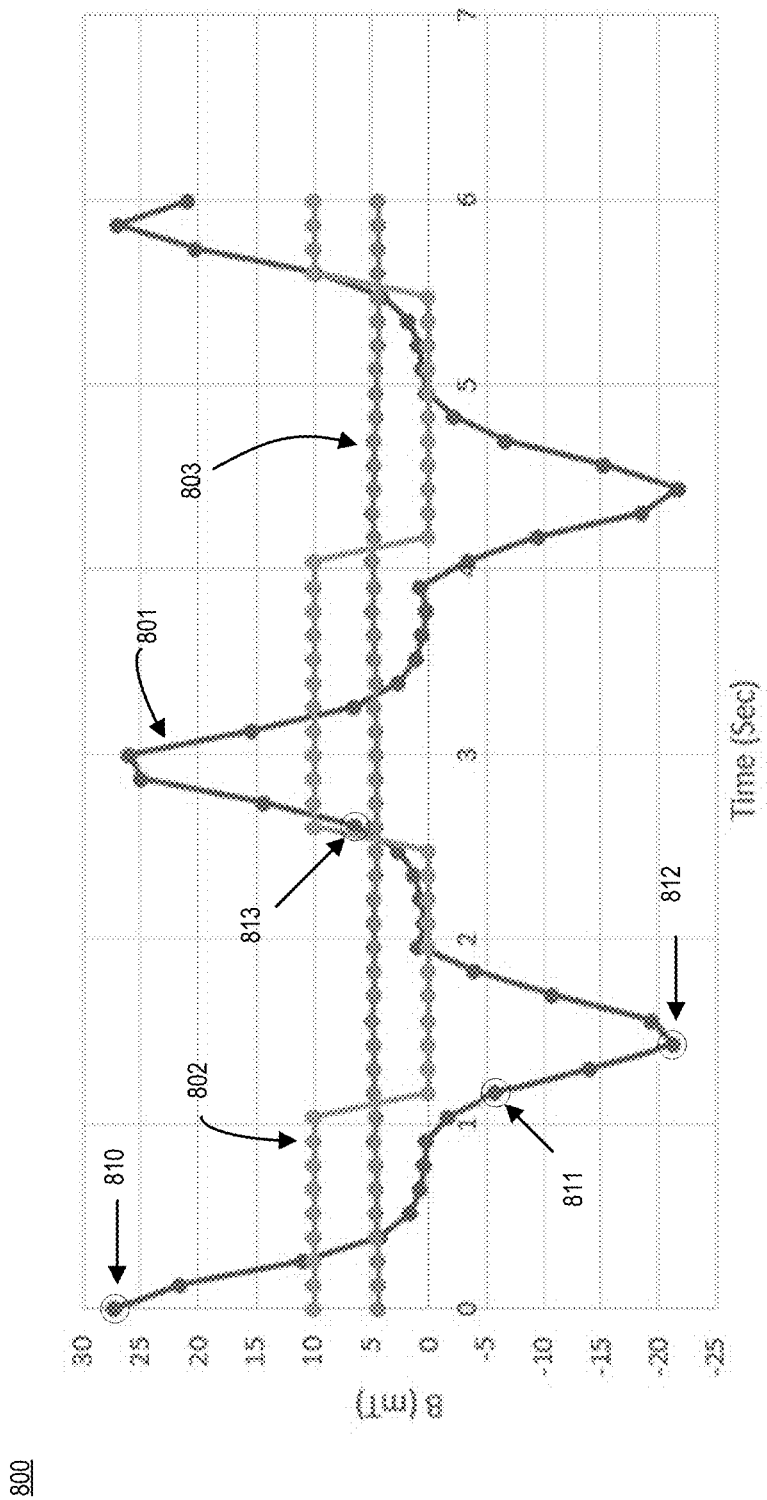
FIG. 8 illustrates exemplary outputs from a system with multiple Hall effect sensors.
Figure 9:
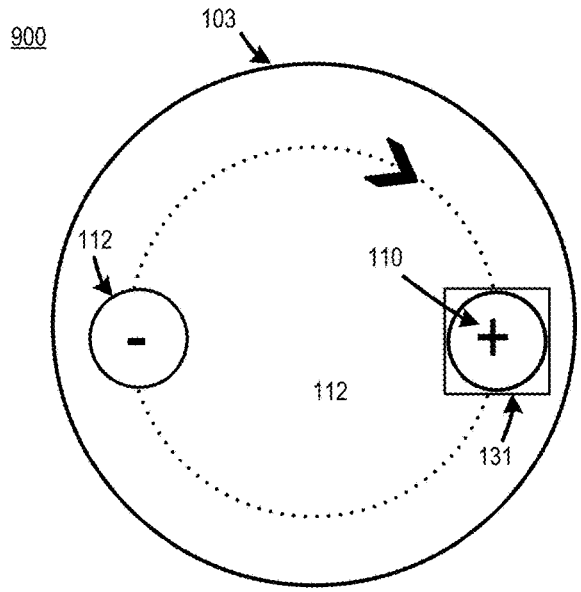
FIGS. 9-12 illustrate a dial wheel at different exemplary positions.

FIG. 8 illustrates example magnetic fields detected by the Hall effect sensors. FIG. 8 shows graph 800 with a vertical axis showing magnetic field (mT), and a horizontal axis showing time. Graph 800 depicts three waveforms 801-803 and exemplary positions 810-814. Waveform 801 represents the magnetic field detected by orbital sensor 131. Waveform 801 varies continuously from high to low, representing the magnetic field detected by orbital sensor 131 as the dial wheel 103 turns.

Waveform 802 represents the latch output from orbital sensor 131. Waveform 802 is either in a high state, indicating the magnetic field measured in waveform 701 has increased above a first, or positive, threshold, or in low state, indicating that the magnetic field measured in waveform 701 has decreased past a second, or negative, threshold. More specifically, the waveform 802 output lowers to the low, or $V_{OL}$ state when the detected magnetic field passes a first threshold, e.g., $-B_{hys}$, and rises to the high, or $V_{OH}$ state when the field passes a second threshold, e.g., $+B_{hys}$. FIGS. 9-12 illustrate a dial wheel at different exemplary positions. The positions indicated in FIGS. 9-12 correspond to output positions on graph 800. In this illustration, the hysteresis thresholds $B_{op}$ and $B_{rp}$ on FIG. 6 are +5 mT and −5 mT.

Waveform 803 represents the magnetic field detected by center sensor 132. Waveform 803 stays constant under normal conditions. The use of waveform 803 is discussed further with respect to FIGS. 13 and 14.

At step 701, method 700 involves sensing a first magnetic field by a first magnetic sensor, wherein the first magnetic field is generated by rotating a dial wheel relative to the first magnetic sensor, the dial wheel having a first magnet located at a first orbital position of the dial wheel and a second magnet located at a second orbital position of the dial wheel, wherein a polarity of the first magnet at a surface of the dial wheel is opposite a polarity of the second magnet at the surface of the dial wheel. As discussed with respect to FIGS. 1-4, a first sensor, e.g., orbital sensor 131 detects the changing magnetic field caused by the dial wheel 103 rotating orbital magnets 110 and 112.

At step 702, method 700 involves setting a pulsed output to a first value when the dial wheel is in a first position where the first magnet is aligned with the first magnetic sensor. At the first position, as depicted by dial wheel orientation 900 in FIG. 9, orbital magnet 110 is aligned with orbital sensor 131. Waveform 801 is at position 810, approximately 27 mT, on graph 800. As can be seen, waveform 802, indicating the latch mode from orbital sensor 131, is at a first value, or the high position.

Figure 10:
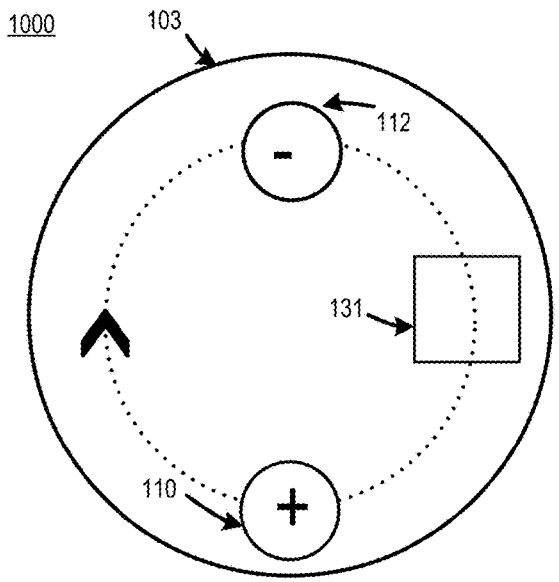

At step 703, method 700 involves, as the dial wheel rotates from the first position to a second position, as depicted by dial wheel orientation 1000 in FIG. 10, the magnetic field at orbital sensor 131 decreases to zero mT when orbital magnet 110 and orbital magnet 112 are equal distance from orbital sensor 131.

The output pulse is maintained at the first value until the magnetic field sensed by the first magnetic sensor reaches the $B_{rp}$ value at waveform position 811. At step 704, method 700 involves once the magnetic field reaches the second threshold value at position 711 of waveform 701, setting the pulsed output to a second value.

Figure 11:
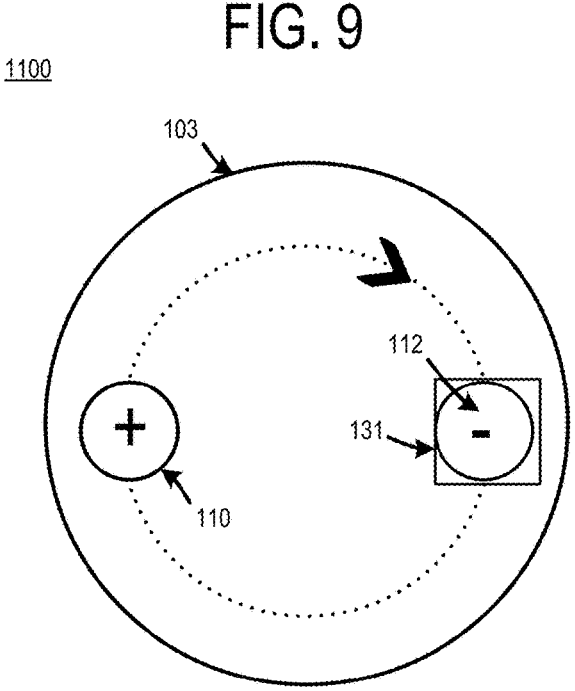

At step 705, the dial wheel 103 has rotated farther such that orbital magnet 112 is now aligned with sensor 131 as depicted by dial wheel orientation 1100 in FIG. 11. Waveform 801 is at a negative peak at location 812. Waveform 802 shows that the latch state is maintained in the second, or low state.

At step 706, method 700 involves as the dial wheel rotates from the second position to the first position, maintaining the pulsed output at the second value until the magnetic field sensed by the first magnetic sensor reaches the $B_{op}$ value, position 813 on waveform 802, as depicted by FIG. 8.

Figure 12:
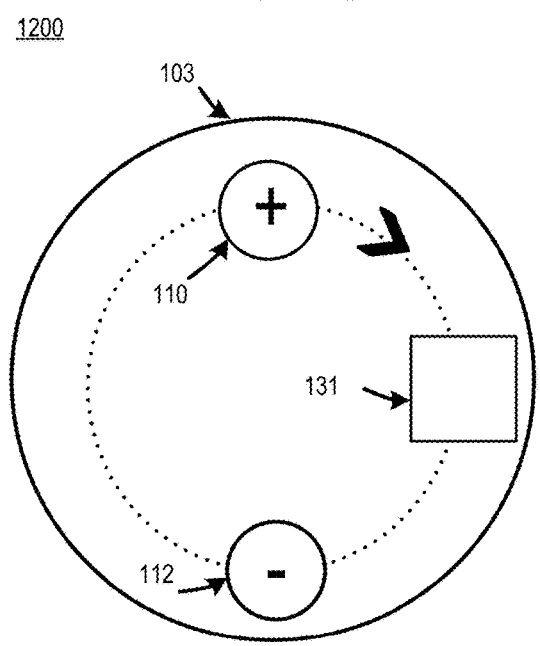

At step 706, as orbital magnet 110 moves closer to orbital sensor 131, as depicted by dial wheel configuration 1200 in FIG. 12, the magnetic field at orbital sensor 131 increases to zero mT when orbital magnet 110 and orbital magnet 112 are equal distance from orbital sensor 131. The output pulse is maintained at the second value until the magnetic field sensed by the first magnetic sensor reaches the $B_{op}$ value at position 813 of waveform 802.

At step 707, method 700 involves once the magnetic field reaches the $B_{op}$ value at position 813, switching the pulsed output back to the first value.

At step 708, method 700 involves adjusting a consumption value for each detected pulse in the pulsed output. Using method 700, the latch output from orbital sensor 131 provides a pulsed output that is used by processor 124 to detect resource consumption, such as gas consumption. A rotation of dial wheel 103 indicates that a specific amount of volume of a resource has been consumed. The resource consumption can be maintained in a count variable which is incremented after every detected pulse. The count variable can be stored in processor 124 and sent to radio 123 to be transmitted to another system for billing purposes.

Figure 13:
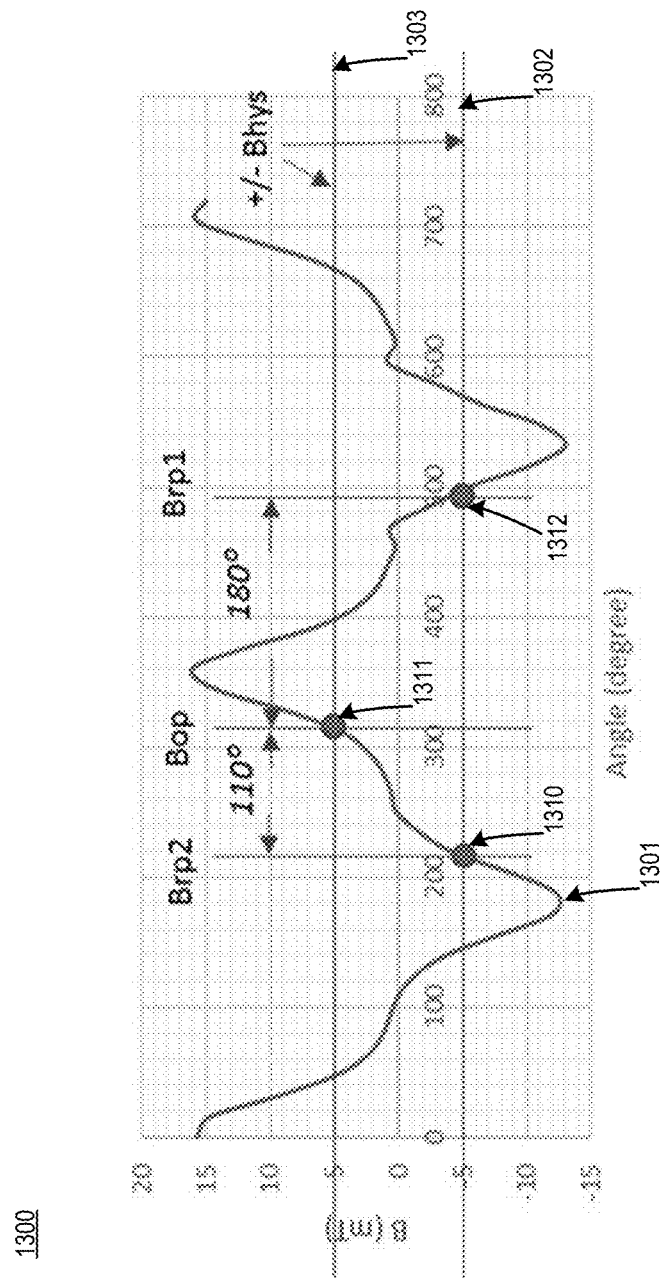
FIG. 13 illustrates an exemplary magnetic field in a meter reading sensor system.

FIG. 13 illustrates an exemplary magnetic field in a meter reading sensor system. Graph 1300 shows waveform 1301, $B_{op}$ level 1303, $B_{rp}$ level 1302, and positions 1310-1312. Waveform 1301 represents the measured magnetic field at orbital sensor 131.

In particular, graph 1300 indicates a sensor system's tolerance for magnet bounce. More specifically, using orbital sensor 131 in latch mode allows for high margins of magnet bounce without causing a false count. As can be seen on graph 1300, as dial wheel 103 rotates and the magnetic field reaches point 1311, the latch value moves to the positive threshold level. Graph 1300 shows built-in bounce error margins of 110 and 180 degrees in the negative and positive directions. Error margins are shown for illustrative purposes only and can vary by system design.

For example, if dial wheel 103 is disturbed when the dial wheel is at a position corresponding to point 1311, the system provides for a high degree of bounce protection. In an example configuration, a rotation at least 110 degrees in counterclockwise would be needed to cause the latch output to change state before causing an erroneous measurement. Similarly, dial wheel 103 would be required to rotate at least 180 degrees counterclockwise to reach point 1312 before causing a false count. Similar magnet bounce tolerance can be obtained with a system that includes two orbital sensors, such as depicted in FIG. 16.

Figure 14:
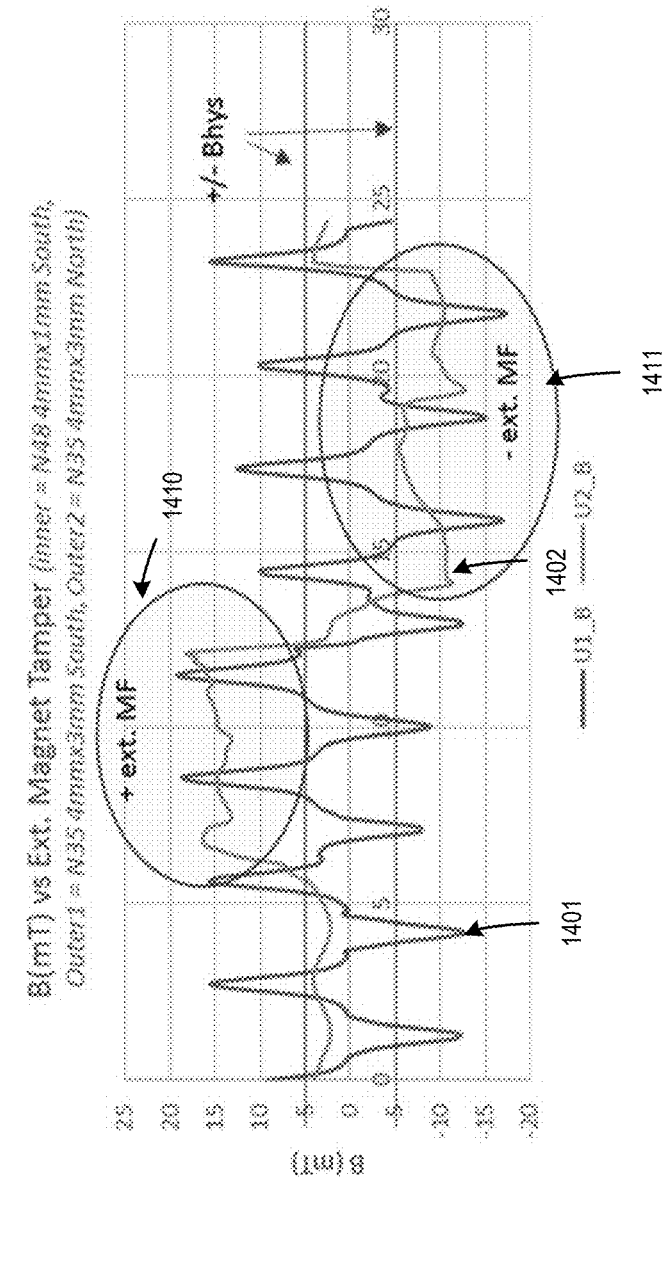
FIG. 14 illustrates an effect of an external magnetic field on a meter reading sensor system.

FIG. 14 illustrates an effect of an external magnetic field on a meter reading sensor system. Graph 1400 shows waveforms 1401-1402. Waveform 1401 represents the measured magnetic field at orbital sensor 131. Waveform 1402 represents the measured magnetic field at center sensor 132. As discussed, the expected normal output of waveform 1402 is a roughly constant value. Accordingly, any deviations from this expected value can be used to detect tampering.

As can be seen on graph 1400, as dial wheel 103 rotates and causes a change in magnetic field as depicted by waveform 1401. Waveform 1402, originating from the center sensor 132, is changing significantly from an external magnetic source. At location 1410, waveform 1402 reflects the result a 25 mT south pole magnetic field being applied. At location 1411, waveform 1402 reflects the result of a −25 mT magnetic field from a north pole being applied.

Even though an external magnetic field is being applied, the latch mode of orbital sensor 131 ensures that the rotation of the dial wheel 103 is properly measured. Processor 124 receives the output signal from center sensor 132. If the output signal has risen above or fallen below a threshold such that error is possible or likely, then processor 124 can take action. Action can include shutting down operation, or sending a message to a utility company via radio 123. Similarly, tamper detection such as the removal of the communication system 120, can cause the magnetic field from center magnet 111 measured at center sensor 132 to drop or be eliminated. The processor 124 can determine that the magnetic field has fallen below a threshold and take action such as shutting off the resource. Similar external magnet tolerance can be obtained with a system that includes two orbital sensors, such as depicted in FIG. 16.

Figure 15:
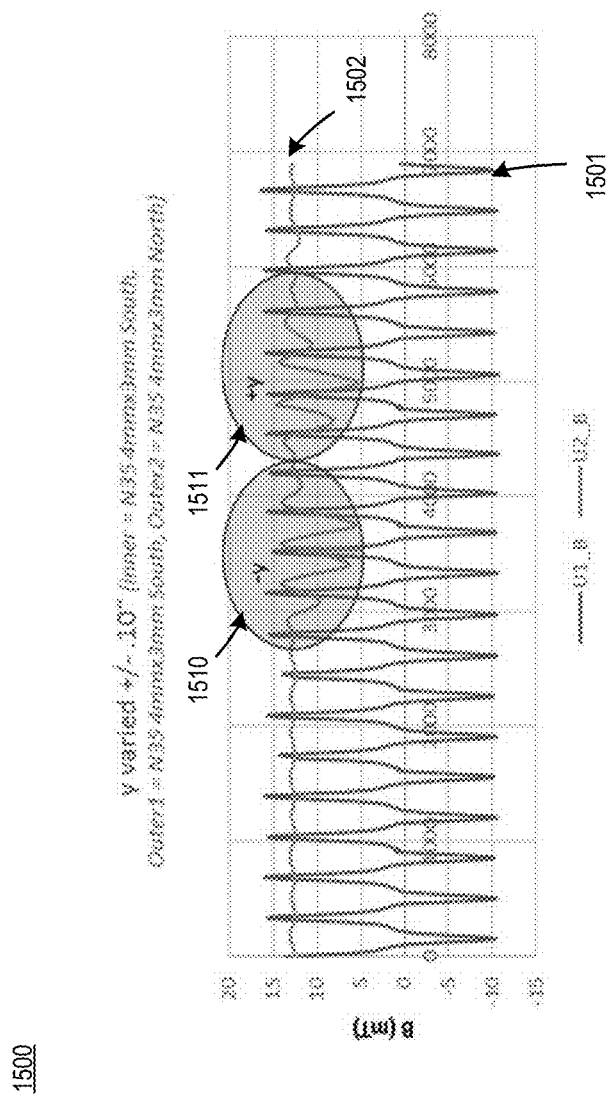
FIG. 15 illustrates an effect of a magnet misalignment on a meter reading sensor system.

FIG. 15 illustrates an effect of a magnet misalignment on a meter reading sensor system. Graph 1500 shows waveforms 1501 and 1502 and locations 1510 and 1511. Waveform 1501 represents the measured magnetic field at orbital sensor 131. Waveform 1502 represents the measured magnetic field at center sensor 132. Magnet misalignment occurs when the orbital magnets 110 or 112 are misaligned in any dimension (i.e., the x, y, or z axes) relative to the sensors. For example, misalignment can occur because of a slight tilt in dial wheel 103, warping of the dial wheel, effects from heat such as the sun, or manufacturing tolerances. FIG. 15 illustrates the resistance by the latch mode to such variations.

In particular, locations 1510 and 1511 show areas where the magnet has been misaligned relative to the sensor board on they axis. At locations 1510 and 1511, the magnetic field measured at orbital sensor 131 is maintained greater than the latch threshold amount when the sensor to dial-wheel distance in the y axis is varied from 0.15 inches to 0.25 inches. As can be seen on graph 1500, as dial wheel 103 is rotating and causing a change in magnetic field as expected even in the presence of magnet misalignment. As can be seen, at locations 1510 and 1511, waveform 1502 is fluctuating due to magnet misalignment. Although the magnet misalignment is causing the detected waveform 1502, waveform 1501 is still as expected, indicating that the resource is being correctly measured. If waveform 1502 fluctuates past a threshold, then processor 124 can take action including disabling resource usage, or contacting the utility company. Similar magnet misalignment tolerance can be obtained with a system that includes two orbital sensors, such as depicted in FIG. 16.

FIG. 16 illustrates an exemplary dial wheel with two orbital sensors. FIG. 16 includes sensor and wheel combination 1600. Combination 1600 includes a dial wheel 1603 with orbital magnet 110, orbital magnet 112, orbital sensor 131, and an additional orbital sensor 1601. Orbital sensor 131 and additional orbital sensor 1601 are shown 180 degrees out-of-phase, but can be located anywhere in the dial wheel. A pulse is detected by triggering on either the rising or falling edge of the pulse. The orbital sensors 131 and 1601 can be implemented with magneto-resistive, Hall effect, or tunnel magnetoresistance (TMR) sensors. Orbital sensors 131 and 1601 can be configured as a bipolar latch output sensor.

Figure 17:
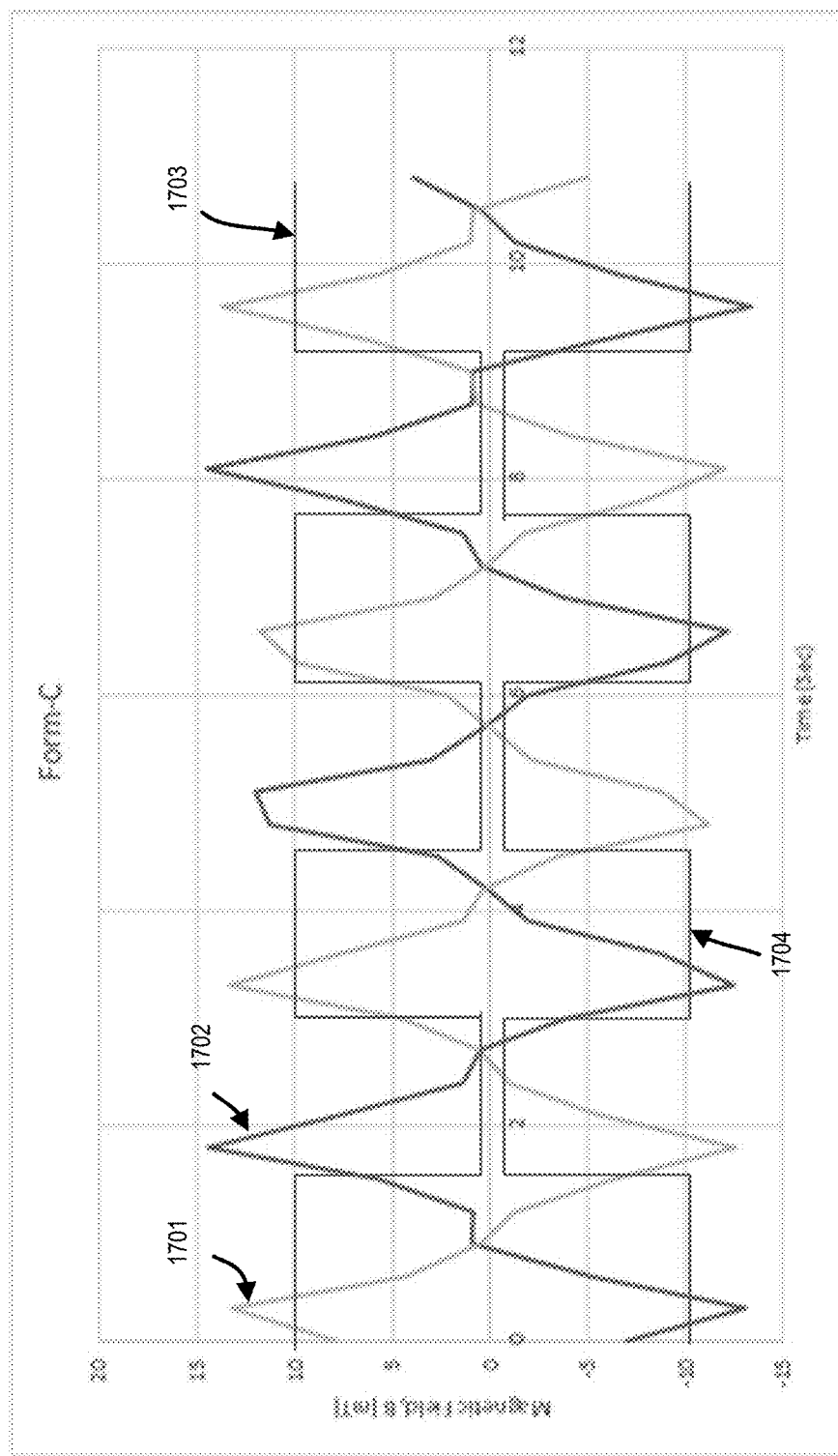
FIG. 17 illustrates example waveforms from a configuration with two orbital sensors.

Each additional orbital sensor 1601 and 131 can operate in latch mode and generate an output pulse. FIG. 17 illustrates example waveforms from a configuration with two orbital sensors. Graph 1700 depicts waveforms 1701 and 1702 representing the magnetic fields of orbital sensor 131 and additional orbital sensor 1601 respectively. For each revolution of dial-wheel rotation, two output pulses are generated, one in waveform 1703 and one in waveform 1704. One revolution of dial-wheel rotation, or a pulse from orbital sensor 131 and a pulse from additional orbital sensor 1601, represents a unit of volume consumed. The sensor implementation depicted in FIG. 16 is compatible with a "Form-C" output telemetry with three terminals. The dial wheel depicted in FIG. 16 can be used in conjunction with other features such as tamper detection.

FIGS. 18 and 19 illustrate configurations in which the sensors are located around the circumference of the dial-wheel. FIG. 18 depicts wheel system 1800. Wheel system 1800 includes sensors 1801 and 1802 mounted on mount 1803. Sensors 1801 and 1802 can be Hall effect or magneto-resistive sensors. Mount 1803 is shown as curved, but any mounting arrangement that ensures that sensors 1801 and 1802 are separated by 90 degrees relative to the wheel is acceptable. FIG. 18 also includes magnets 1804 and 1805. Magnets 1804 and 1805 are positioned perpendicular to the surface of the dial wheel, towards opposite edges of the wheel. Magnet 1804 is positioned such that a positive magnetic field is facing the edge. Magnet 1805 is positioned such that a negative magnetic field is facing the edge. But other configurations are possible. The positioning of the magnets can allow for a shaft to be connected to the middle of the dial wheel.

The configurations described in FIGS. 18 and 19 lack the center magnet 111 and center sensor 132 as depicted by FIG. 5. Instead, as described further, tamper detection can be implemented via sensors 1801 and 1802.

The sensors can be configured in latch mode. The sensor can be mounted on a flexible printed circuit board (PCB) as depicted by 1803 or by other means such that the two sensors are 90 degrees out-of-phase with respect to the revolutions of the dial-wheel. Wheel system 1800 can be compatible with "Form-A" telemetry with two terminals if one of the sensors 1801 or 1802 is used. Wheel system 1800 can be compatible with "Form-C" in the case that both sensors are used.

FIG. 19 includes wheel system 1900. Wheel system 1900 includes sensor 1801, sensor 1802, and mount 1803. Wheel system 1900 differs from wheel system 1800 in that wheel system 1900 includes one magnet, 1901, located centrally on the wheel. Magnet 1901 is positioned perpendicular to the surface of the dial wheel.

Wheel systems 1800 and 1900 can implement tamper detection using sensors 1801 and 1802. Sensors 1801 and 1802 output a detected magnetic field value and provide the value to processor 124. Processor 124 receives the outputs from sensors 1801 or 1802. If the processor 124 detects that the magnetic field has crossed a threshold, then processor 124 can indicate an alarm condition.

Figure 20:
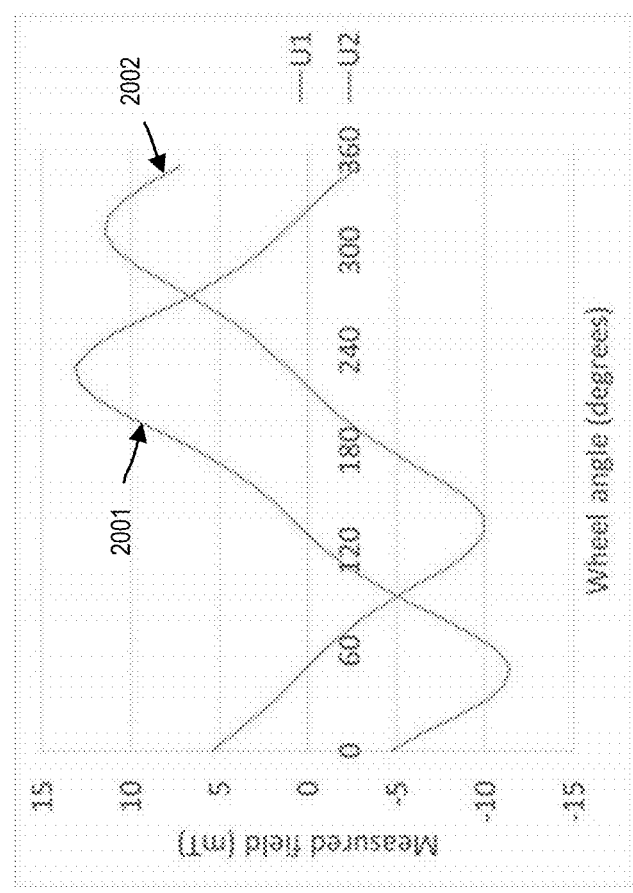
FIG. 20 depicts example waveforms generated by the wheel system depicted in FIG. 18.

FIG. 20 depicts example waveforms generated by the wheel system depicted in FIG. 18. FIG. 20 includes graph 2000 that depicts waveform 2001 and 2002. Waveforms 2001 and 2002 are 90 degrees out of phase. Consequently, waveforms 2001 and 2002 do not both cross zero (mT) at the same time. Because a detected value from both sensors, i.e., sensor 1801 and 1802, of zero is abnormal, such a configuration permits tamper detection. For example, when the device with the sensors is removed from the dial-wheel or from the meter, the system detects tampering due to the detection of zero or near zero magnetic field for both sensors.

Sensors 1801 and 1802 can be used to detect misalignment and external magnetic fields. The magnetic field values are read from both sensors. In an example, the sensor system can record a measurement of the detected magnetic field from both sensors 1801 and 1802 over a complete revolution of the dial-wheel. Given that the amplitude and phase angle of the detected magnetic fields are predictable, any deviation from these expected values can indicate misalignment or external magnet tamper. Interpretation of any variance depends on a careful characterization of the resulting magnetic field.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A pulse sensor, comprising:
   a dial wheel having a first magnet located at a first orbital position of the dial wheel, a second magnet located at a second orbital position of the dial wheel, and a third magnet located on a center axis of the dial wheel, wherein the first magnet comprises a north pole and a south pole and the second magnet comprises a north pole and a south pole and wherein the first magnet and the second magnet are located perpendicular to the center axis of the dial wheel;

a first magnetic sensor for sensing a magnetic field, wherein the first magnetic sensor is positioned so that during a rotation of the dial wheel, when the dial wheel is in a first position the north pole of the first magnet is aligned with the first magnetic sensor and when the dial wheel is in a second position the south pole of the second magnet is aligned with first magnetic sensor; and the first magnetic sensor configured to generate a pulsed output for each rotation of the dial wheel, wherein
  when the dial wheel is in a first position, the pulsed output is a first value;
  as the dial wheel rotates from the first position to the second position, the pulsed output remains at the first value until the magnetic field sensed by the first magnetic sensor reaches a second threshold value;
  once the magnetic field reaches the second threshold value, the pulsed output switches to a second value and remains at the second value until the dial wheel rotates to the second position;
  as the dial wheel rotates from the second position to the first position, the pulsed output remains at the second value until the magnetic field sensed by the first magnetic sensor reaches a first threshold value;
  once the magnetic field reaches the first threshold value, the pulsed output switches to the first value; and a second magnetic sensor positioned in alignment with the center axis of the dial wheel so that the second magnetic sensor is aligned with the third magnet, and wherein the second magnetic sensor is configured to sense a magnetic field along the center axis and to generate a second output proportional to the magnetic field, the second magnetic sensor is configured to detect a first error condition based on the magnetic field falling below a first threshold and a second error condition based on the magnetic field rising above a second threshold.

2. The pulse sensor of claim 1, wherein a polarity of a first magnetic field value sensed by the first magnetic sensor when the dial wheel is in the first position is opposite a polarity of a second magnetic field value sensed by the first magnetic sensor when the dial wheel is in the second position.

3. The pulse sensor of claim 1, wherein the first magnetic sensor is one of (i) an integrated digital device with latch mode or (ii) an analog device that can output a voltage indicative of a magnetic field in combination with additional circuitry configured to implement a latch function.

4. The pulse sensor of claim 1, wherein the first magnetic sensor generates the pulsed output based on detecting that the magnetic field has passed a threshold based on a first hysteresis of the first magnetic sensor.

5. The pulse sensor of claim 1, wherein the first magnetic sensor is a bipolar Hall effect sensor, and wherein the bipolar Hall effect sensor configured to operate in a latch mode.

6. The pulse sensor of claim 4, wherein the pulsed output switching from the second value to the first value indicates that one unit of measure is consumed.

7. A pulse sensor, comprising:
a dial wheel having a magnet located at a first orbital position of the dial wheel, wherein the magnet comprises a north pole and a south pole and wherein the magnet is located in an orbital position with the north pole and the south pole located perpendicular to an axis of the dial wheel;

a sensor board including a magnetic sensor for sensing a magnetic field, wherein the sensor board is positioned so that during a rotation of the dial wheel relative to the sensor board when the dial wheel is in a first position the north pole of the magnet is aligned with the magnetic sensor and when the dial wheel is in a second position the south pole of the magnet is aligned with magnetic sensor;

the magnetic sensor configured to generate a pulsed output for each rotation of the dial wheel, wherein
  when the dial wheel is in a first position, the pulsed output is a first value,
  as the dial wheel rotates from the first position to the second position, the pulsed output remains at the first value until the magnetic field sensed by the magnetic sensor reaches a second threshold value;
  once the magnetic field reaches the second threshold value, the pulsed output switches to a second value and remains at the second value until the dial wheel rotates to the second position;
  as the dial wheel rotates from the second position to the first position, the pulsed output remains at the second value until the magnetic field sensed by the magnetic sensor reaches a first threshold value; and
  once the magnetic field reaches the first threshold value, the pulsed output switches to the first value.

8. The pulse sensor of claim 7, wherein a polarity of a first magnetic field value sensed by the magnetic sensor when the dial wheel is in the first position is opposite a polarity of a second magnetic field value sensed by the magnetic sensor when the dial wheel is in the second position.

9. The pulse sensor of claim 7, wherein the magnetic sensor is a Hall effect sensor, and wherein the Hall effect sensor is configured to either (i) operate in a latch mode or (ii) generate a latch in conjunction with a latching circuit.

10. The pulse sensor of claim 7, wherein the magnetic sensor generates the pulsed output based on detecting that the magnetic field has passed a threshold based on a hysteresis of the magnetic sensor.

11. The pulse sensor of claim 7, wherein the pulsed output switching from the second value to the first value indicates that one unit of measure is consumed.

12. The pulse sensor of claim 7, further comprising:
an additional magnet located at a center of the dial wheel; and
an additional magnetic sensor, wherein the sensor board is positioned so that the additional magnetic sensor is aligned with the additional magnet, and wherein the additional magnet sensor is configured to generate an additional output proportional to an additional received magnetic field, wherein
the additional magnetic sensor is configured to detect an error condition based on the additional received magnetic field falling below a first threshold or the additional received magnetic field rising above a second threshold.

13. A pulse sensor, comprising:
a dial wheel having a first magnet located at a first orbital position of the dial wheel and a second magnet located at a second orbital position of the dial wheel, wherein a polarity of the first magnet at an edge of the dial wheel is opposite a polarity of the second magnet at the edge of the dial wheel;

a first magnetic sensor for sensing a magnetic field, wherein the first magnetic sensor is positioned outside and adjacent to a circumference of the dial wheel, wherein the first magnetic sensor is positioned so that during a rotation of the dial wheel relative to the first magnetic sensor when the dial wheel is in a first position the first magnet is aligned with the first magnetic sensor;

a second magnetic sensor for sensing a magnetic field, wherein the second magnetic sensor is positioned outside and adjacent to the circumference of the dial wheel and at a position located ninety degrees around the dial wheel from the first magnetic sensor, so that during a rotation of the dial wheel relative to the second magnetic sensor when the dial wheel is in a second position the first magnet is aligned with the second magnetic sensor;

wherein for each rotation of the dial wheel, the first magnetic sensor is configured to generate a first pulsed output and the second magnetic sensor is configured to generate a second pulsed output, wherein when the dial wheel is in a first position, the first magnet is aligned with the first magnetic sensor and the first pulsed output is a first value;

as the dial wheel rotates from the first position to the second position, the first magnet is aligned with the second magnetic sensor and the second pulsed output is at the first value;

as the dial wheel rotates from the second position to a third position, the second magnet is aligned with the first magnetic sensor and the first pulsed output is at a second value; and as the dial wheel rotates from the third position to fourth position, the second magnet is aligned with the second magnetic sensor and the second pulsed output is at the second value.

14. The pulse sensor of claim 13, wherein the first magnetic sensor generates the first pulsed output based on detecting that the magnetic field has passed a first threshold based on a first hysteresis of the first magnetic sensor and the second magnetic sensor generates the second pulsed output based on detecting that the magnetic field has passed a second threshold based on a second hysteresis of the second magnetic sensor.

15. The pulse sensor of claim 14, wherein a combination of a first digital output pulse and a second digital output pulse indicates that one unit of measure is consumed.

16. The pulse sensor of claim 13, wherein the first magnetic sensor is one of (i) an integrated digital device with latch mode or (ii) an analog device that can output a voltage indicative of a magnetic field in combination with additional circuitry configured to implement a latch function.

17. The pulse sensor of claim 13, wherein the first magnetic sensor is a Hall effect sensor, and wherein the Hall effect sensor is configured to either (i) operate in a latch mode or (ii) generate a latch in conjunction with a latching circuit.

18. The pulse sensor of claim 13, further comprising a processor configured to receive the first pulsed output and the second pulsed output and responsive to detecting that both the first pulsed output and the second pulsed output are both zero, indicate an alarm condition.

19. The pulse sensor of claim 13, further comprising a processor configured to determine an alarm condition by comparing the first pulsed output to a first predetermined value and the second pulsed output to a second predetermined value.

* * * * *